United States Patent Office 3,067,238
Patented Dec. 4, 1962

3,067,238
DIMERIZATION OF ACTIVE METHYLENE COMPOUNDS BY OXIDATION
Charles E. Frank, David W. Lum and Irving L. Mador, Cincinnati, Ohio, assignors to National Distillers and Chemical Corporation, New York, N.Y., a corporation of Virginia
No Drawing. Filed Nov. 21, 1958, Ser. No. 775,373
7 Claims. (Cl. 260—475)

The present invention relates to a process for dimerization of certain organic compounds containing an active hydrogen atom, and, more particularly, to a process for dimerization of organic compounds containing an active methylene group. More specifically, the invention relates to dimerization of an ester of phenylacetic acid, such as methyl and ethyl phenylacetate to dimethyl-$\alpha,\beta$-diphenylsuccinate and diethyl $\alpha,\beta$-diphenylsuccinate, respectively; phenylacetonitrile to diphenylsuccinonitrile, etc.

In accordance with this invention, an organic compound, containing an active hydrogen atom, is subjected to contact in liquid phase with oxygen in the presence of a catalytic amount of a metal ion which as a salt has a reduction potential, measured in aqueous solution, of +0.16 to 0.91 volt and, embodied therein, is such a process in which the salts are preformed or formed in situ.

Illustrative of compounds for use in the dimerization process embodied herein, and which contain an active hydrogen atom, are alkyl or aryl esters of phenylacetic acid, diphenylmethane, phenylacetonitrile, phenyl acetone, etc. Structurally, the following are illustrative of such compounds in which Ar represents an aromatic ring, and R and R' represent hydrogen, an aliphatic group or an aromatic group:

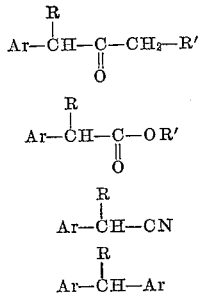

Within the scope of such compounds for use in the process embodied herein, preferred compounds contain, attached to a methylene group to be dimerized, one phenyl group and one other activating group such as phenyl, nitrile, carbonyl or carboxyl. Examples of the metal ions for the dimerization reaction embodied herein are copper ($Cu^{+2}$), silver ($Ag^{+1}$), mercury ($Hg^{+2}$) and iron ($Fe^{+3}$) and, particularly, in the form of salts thereof such as benzoates, acetates, oleates, octanoates, etc. Also suitable for use are salts of $Cu^{+1}$ and $Fe^{+2}$.

Though it is not intended to be bound by any theoretical explanation of the catalytic action of these salts, it is believed that the primary reaction is an oxidation-reduction between the substrate and the metal ion as in $$RCH_2-X+M^n \rightarrow R\dot{C}H-X+M^{n-1}+H^+$$

whereby the oxygen serves to reoxidize the metal salt so that it continuously recycles in this manner.

The reaction may be carried out over a rather broad range of temperature such, for example, from about 50° to about 250° C. but, preferably, from about 95° to about 210° C. The reaction can be carried out at atmospheric or elevated pressures and, for example, up to about 500 p.s.i. In instances wherein the vapor pressure of the compound to be dimerized exceeds one atmosphere within the generic temperature range set forth hereinbefore, use of pressure is required.

In general, the compound to be dimerized is contacted in liquid phase with oxygen in presence of a small, catalytic amount of a free metal that dissolves in the reaction mixture, as by formation of a salt, or by addition of a preformed salt. Generally, the reaction is carried out by use of the metal ion in an amount, based on the moles of compound to be dimerized, of from about 0.01 to 5; and preferably, from about 0.1 to 2.0 mole percent. In preferred embodiment, the reaction is carried out in absence of a reaction medium but, if desired, inert reaction mediums can be used such, for example, ethyl benzoate.

The time required for effecting the dimerization reaction depends on the reactants, reaction conditions, etc. employed and, in general, may vary from a few minutes up to several hours.

In order to further describe the invention, the following embodiments are set forth for the purpose of illustration and not limitation. In the embodients set forth in the following tabulation, there is included Run No. 1 in which no catalyst was used as well as Run Nos. 2 and 3 using magnesium and aluminum. As shown, such metals produced less dimers than when no catalyst was used. On the other hand, as illustrated by the remaining examples using a catalyst falling within the scope of this invention, markedly increased yields of the desired dimer were obtained.

For the runs set forth in the following tabulation, oxygen was passed through methyl phenylacetate, at the temperatures shown for the stated periods of time, at rates of one to ten liters/hour through a fritted glass bubbler in a flask containing the methyl phenylacetate and catalyst (when used). Mixing was effected by a magnetic stirrer. Volatile products of the reaction (e.g., water, methanol, and benzaldehyde) were trapped in a distillation receiver fitted with a water-cooled condenser. At completion of the reaction, the dimer was precipitated by cooling the reaction mixture to room temperature and the addition of two volumes of methanol or ethanol. Unreacted monomer was recovered by vacuum distillation.

| Run No. | Catalyst | Catalyst Concentration, Mole percent | Time (hrs.) | Temp., °C. | Percent Yield of dimethyl $\alpha,\beta'$-diphenyl-succinate (based on reacted monomer) |
|---|---|---|---|---|---|
| 1 | none | | 18 | 210 | 15 |
| 2 | magnesium powder | 3.1 | 18 | 210 | 9 |
| 3 | aluminum powder | 2.7 | 18 | 210 | 11 |
| 4 | iron powder | 1.3 | 18 | 210 | 24 |
| 5 | copper powder | 1.2 | 18 | 210 | 55 |
| 6 | copper oleate | 0.2 | 18 | 210 | 43 |
| 7 | cuprous chloride | 0.2 | 18 | 210 | 35 |
| 8 | copper powder | 1.2 | 18 | 210 | 48 |

The following examples illustrate further embodiments of the process of this invention with Example 2 illustrating the improvement in yield by addition of an acid (benzoic) to the reaction mixture containing a suitable metal (copper) catalyst.

*Example 1*

100 gm. of methyl phenylacetate, 2.08 gm. of copper oleate and 9.9 gm. of residue (from the oxidation of methyl phenylacetate in the absence of copper catalysts) were placed in a reaction flask and heated to 210° C. Oxygen was passed through the reaction mixture for three hours at a rate of 5 liters an hour with a total absorption of 3.1 liters. The reaction mixture was cooled to 70° C., poured into 200 ml. of methanol and cooled in an ice bath. The dimer was filtered, washed with cold methanol and dried in a vacuum desiccator (16.8 gm.). The unreacted monomer was recovered by vacuum distillation (70.7 gm.) with 18.8 gm. left as residue. The yield of dimer was 57 percent based on the unrecovered methyl phenylacetate.

*Example 2*

100 gm. of methyl phenylacetate, 1.0 gm. of copper powder, and 13.5 gm. of benzoic acid were heated to 210° C. in a pyrex reaction flask. Oxygen was bubbled through the mixture for 3 hours at a rate of 5 liters an hour with a total absorption of 2.5 liters. The reaction mixture was cooled to about 100° C. and the contents of the flask poured into 200 ml. of methanol. On cooling 31.9 gm. of dimer was obtained by filtration. The unreacted monomer (53 gm.) was recovered by vacuum distillation leaving 23.1 gm. of residue. Yield of dimer was 68 percent based on unrecovered monomer.

*Example 3*

50 mg. of fine copper metal powder was placed in a pyrex flask with 100 gm. of methyl phenylacetate and the mixture heated to 210° C. Oxygen was bubbled through the mixture for 18 hours at a rate of one liter per hour. At the end of this time the reaction flask was cooled to room temperature and 200 ml. of ethanol added. After cooling in an ice-water bath for 30 minutes the crystals were filtered and washed with about 100 ml. additional methanol. On drying in a vacuum desicator, 20 gm. of product was obtained. The unreacted monomer was recovered by first flashing off the solvent at 30 mm. pressure, then distilling the monomer at about 0.1 mm. pressure. 43 gm. recovered monomer and 24 gm. residue were obtained for a yield of 35 percent.

*Example 4*

1.4 gm. of copper oleate was suspended in 150 gm. of methyl phenylacetate. The mixture was heated to 210° C. for 18 hours while oxygen was bubbled through the liquid at the rate of one liter per hour. After cooling to room temperature 300 ml. of ethanol was added and the mixture cooled in an ice bath for 30 minutes. The crystals formed were filtered, washed with ethanol and vacuum dried. The unreacted methyl phenylacetate was recovered by vacuum distillation at about 0.1 mm. pressure, after flashing off the ethanol. 32 gm. of dimer, 27 gm. residue and 74 gm. of recovered methyl phenylacetate were obtained for a yield of 42 percent.

In the process embodied herein, oxygen or a free-oxygen-containing gas can be used and, as illustrated by Example 2, the process is preferably carried out in presence of an acid as, for example, benzoic acid, phenylacetic acid, etc. as use thereof generally increases the overall oxidation of the monomer to be dimerized. Other acids suitable for such a purpose include o-benzoylbenzoic, p-toluic acid, etc. Although the amount of such acids may be varied over a rather wide range, depending on the particular acid used, the particular reactants employed, reaction conditions, etc., use of from about 7 to 15 moles of the acid are generally satisfactory per mole of a free metal (e.g., copper, iron) when used for the reaction and from about 5 to 15 moles per mole of metal salt when metal salts are used.

In general, it is suitable to furnish a flow of oxygen or free-oxygen-containing gas so that the solution is always saturated with oxygen. This may be accomplished with a partial pressure of oxygen of 0.2 atmospheres (as in the use of air) up to several atmospheres oxygen pressure. However, this is not the important factor in controlling the rate of reaction, which is a function of the reactivity of the monomer, the temperature, etc. The rate of oxygen supplied is such that the metal salt is maintained primarily in its upper oxidation state.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process which comprises contacting with a free-oxygen-containing gas a substrate from the group consisting of alkyl esters of phenylacetic acid, diphenylmethane, phenylacetonitrile and phenylacetone in liquid phase in the presence of a catalyst selected from the group consisting of iron powder, copper powder, copper oleate, and cuprous chloride, whereby the metal ion of said catalyst is in solution in said substrate in an amount of from about 0.01 to about five mole percent based on said substrate to produce a dimer consisting of two molecules of said substrate less one hydrogen atom per molecule of said substrate, joined at the methylene carbon atom linked to a phenyl group in such substrate.

2. A process, as defined in claim 1, wherein the substrate is contacted with oxygen in the presence of an organic acid salt of the catalyst metal.

3. A process, as defined in claim 1, wherein the substrate is contacted with the free-oxygen-containing gas at a temperature of from about 50° C. to about 250° C.

4. A process, as defined in claim 1, wherein the substrate is contacted with oxygen in an amount sufficient to maintain saturated with oxygen the substrate containing in solution an organic acid salt of said catalyst metal.

5. A process, as defined in claim 1, wherein the contacting of the substrate in presence of the catalyst metal is carried out in presence of an organic acid.

6. A process, as defined in claim 5, wherein the organic acid is from the group consisting of benzoic acid, phenylacetic acid, o-benzoylbenzoic acid and p-toluic acid.

7. A process which comprises contacting a liquid solution of methyl phenylacetate containing from about 0.01 to about 5 mole percent, per mole of methyl phenylacetate, of a catalyst selected from the group consisting of iron powder, copper powder, copper oleate, and cuprous chloride, whereby the metal ion of said catalyst is dissolved in said solution of methyl phenylacetate, at from about 50° to about 250° C. with oxygen in an amount sufficient to maintain said solution saturated with oxygen to produce dimethyl alpha, beta-diphenylsuccinate.

References Cited in the file of this patent

UNITED STATES PATENTS

| | | |
|---|---|---|
| 2,524,319 | Kharasch | Oct. 3, 1950 |
| 2,751,406 | Ipatieff et al. | June 19, 1956 |

OTHER REFERENCES

Fieser et al.: Organic Chemistry, pages 637, 8 (Reinhold, 1956).